(12) United States Patent
Roche

(10) Patent No.: US 10,344,772 B2
(45) Date of Patent: Jul. 9, 2019

(54) FAN BLADE WITH COMPOSITE COVER AND SACRIFICIAL FILLER

(71) Applicant: United Technologies Corporation, Hartford, CT (US)

(72) Inventor: Charles H. Roche, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 473 days.

(21) Appl. No.: 15/039,268

(22) PCT Filed: Sep. 29, 2014

(86) PCT No.: PCT/US2014/058008
§ 371 (c)(1),
(2) Date: May 25, 2016

(87) PCT Pub. No.: WO2015/105545
PCT Pub. Date: Jul. 16, 2015

(65) Prior Publication Data
US 2017/0023008 A1    Jan. 26, 2017

Related U.S. Application Data

(60) Provisional application No. 61/908,885, filed on Nov. 26, 2013.

(51) Int. Cl.
*F01D 5/14*    (2006.01)
*F04D 29/38*    (2006.01)
(Continued)

(52) U.S. Cl.
CPC ............ *F04D 29/388* (2013.01); *B23P 15/04* (2013.01); *B64C 11/205* (2013.01); *B64C 11/26* (2013.01);
(Continued)

(58) Field of Classification Search
CPC .... F04D 29/388; F04D 29/023; F04D 29/324; F04D 29/325; F01D 5/147; F01D 5/16; F01D 5/282; F01D 5/048
USPC ........................................................ 416/230
See application file for complete search history.

(56) References Cited

U.S. PATENT DOCUMENTS 6,039,542 A  *  3/2000  Schilling ................... F01D 5/16
                                                         416/224
8,585,368 B2    11/2013  Viens et al.
(Continued)

FOREIGN PATENT DOCUMENTS

DE       102013219772 A1    4/2015
EP            1983160 A2    10/2008
WO       WO 2015/095205   *  6/2015

OTHER PUBLICATIONS

English Machine Translation for Abstract DE102013219772.
(Continued)

*Primary Examiner* — Aaron R Eastman
(74) *Attorney, Agent, or Firm* — Cantor Colburn LLP

(57) ABSTRACT

A fan blade for a turbofan gas turbine engine is disclosed. The fan blade includes a body having a pressure side and a suction side and a cover. The suction side of the body includes an opening and at least one cavity for purposes of reducing the weight of the fan blade. The cover overlays the opening and includes a peripheral edge that is received in a slot defined by the body. The cavities are filled with a sacrificial material.

20 Claims, 5 Drawing Sheets

(51) Int. Cl.
- *F01D 5/28* (2006.01)
- *B64C 11/20* (2006.01)
- *B64C 11/26* (2006.01)
- *F04D 29/02* (2006.01)
- *F04D 29/32* (2006.01)
- *B23P 15/04* (2006.01)
- *F01D 5/16* (2006.01)
- *B29C 70/48* (2006.01)
- *B29K 63/00* (2006.01)
- *B29K 105/08* (2006.01)
- *B29L 31/08* (2006.01)

(52) U.S. Cl.
CPC ............... *F01D 5/147* (2013.01); *F01D 5/16* (2013.01); *F01D 5/282* (2013.01); *F04D 29/023* (2013.01); *F04D 29/324* (2013.01); *F04D 29/325* (2013.01); *B29C 70/48* (2013.01); *B29K 2063/00* (2013.01); *B29K 2105/0872* (2013.01); *B29L 2031/08* (2013.01); *F05D 2220/36* (2013.01); *Y02T 50/672* (2013.01); *Y02T 50/673* (2013.01)

(56) References Cited

U.S. PATENT DOCUMENTS

| | | | |
|---|---|---|---|
| 9,121,287 B2* | 9/2015 | Weisse | F01D 5/147 |
| 2008/0253885 A1* | 10/2008 | Foose | F01D 5/147 |
| | | | 415/208.2 |
| 2010/0136278 A1* | 6/2010 | Cadd | B29C 63/0021 |
| | | | 428/60 |
| 2010/0329887 A1 | 12/2010 | Eifert | |
| 2013/0039774 A1* | 2/2013 | Viens | F01D 5/147 |
| | | | 416/226 |
| 2013/0101406 A1* | 4/2013 | Kweder | B29C 70/46 |
| | | | 415/200 |
| 2013/0142668 A1 | 6/2013 | Snecma | |
| 2013/0156594 A1* | 6/2013 | Kray | F01D 9/042 |
| | | | 416/241 A |
| 2013/0216395 A1 | 8/2013 | Bregman et al. | |
| 2015/0125308 A1* | 5/2015 | Radomski | B23P 15/04 |
| | | | 416/224 |
| 2015/0252679 A1* | 9/2015 | Pope | F01D 5/147 |
| | | | 415/183 |
| 2016/0024934 A1* | 1/2016 | Schwarz | F01D 5/16 |
| | | | 60/805 |
| 2016/0177732 A1* | 6/2016 | Whitehurst | F01D 5/147 |
| | | | 60/805 |
| 2016/0311052 A1* | 10/2016 | Wallis | B23K 20/02 |
| 2016/0333710 A1* | 11/2016 | Klinetob | F01D 5/26 |

OTHER PUBLICATIONS

European Search Report for Application No. EP 14 87 8316.
International Search Report for International Application No. PCT/US2014/058008; dated Jul. 24, 2015.
Written Opinion for International Application No. PCT/US2014/058008; dated Jul. 24, 2015.

* cited by examiner

FAN BLADE WITH COMPOSITE COVER AND SACRIFICIAL FILLER

BACKGROUND

Technical Field

Disclosed herein are fan blades for turbofan gas turbine engines. In one example, a disclosed fan blade may include a metallic body having one or more hollow cavities on a suction side of the fan blade for weight reduction, a composite cover that encloses the hollow cavities and a filler material disposed within the cavities.

Description of the Related Art

A geared turbofan engine is a type of turbofan airplane engine, similar to a turbojet. A geared turbofan engine, also known as a type of a gas turbine engine, may include a geared, ducted fan and a smaller diameter gas turbine engine mounted behind the fan that powers the fan. Part of the airstream passes through a core of the engine, which includes low and high-pressure compressors, a combustion chamber and high and low pressure turbines. The high and low pressure turbines are disposed downstream of the combustor between the combustor and an exhaust outlet. In contrast, the low and high compressors are disposed upstream of the combustor and between the combustor and the fan. The high and low pressure turbines drive the high and low pressure compressors respectively and may also drive the fan.

Weight reduction of gas turbine engines used for aircraft results in fuel savings. One known means for reducing the weight of a gas turbine engine is to include hollow cavities in some of the components that do not need to be solid metal to meet structural requirements. One such component is a fan blade, a type of airfoil which drives air flow into the engine core. Some fan blades include a titanium or aluminum body with recesses or cavities disposed in the non-flow path, convex side of the fan blade, also known as the suction side of the fan blade. The opposite side of the fan blade is the concave or suction side. The cavities may be covered by a composite cover, typically made from fibers and resin, and the fan blade is the then covered with a damage resistant coating that is typically non-structural and inert.

During engine operation, a fan blade or a fragment thereof may separate from the remainder of the fan (a so-called "fan blade-off" or "fan blade-out" (FBO) event). An FBO event may be caused by a foreign object damage (FOD) event. One portion of a fan blade that is vulnerable to separation from the fan blade body is the composite cover for the cavities. Partial or complete separation of the cover from one or more fan blades can cause damage to a downstream component of the engine. The damage caused by the separated cover or partial separated cover may depend on numerous factors, including the size and mass of the separated cover or fragment and the design of the downstream engine components. Further, partial or complete separation of a cover may displace the center of gravity (center of mass) of the entire fan assembly from its central axis. At least initially, bearings may constrain the fan radially so that it continues to rotate about its central axis rather than about the displaced center of gravity. However if the bearings fail rotation of the fan about the displaced center of gravity may result in forces that may also damage other downstream engine components.

If an FBO event severely damages the engine, the engine may cease normal operation, shut down or lock, and consequently produce no further power. However, despite the engine shut down, it is undesirable to stop rotation of the fan. If rotation of the fan stops, the engine becomes an extreme source of aerodynamic drag for the aircraft. Such drag would be particularly significant in a twin-engine aircraft, with one engine mounted within each wing nacelle, a common construction for many passenger aircraft. Thus, in a twin-engine aircraft, the combination of drag from the shut-down engine and thrust from the remaining engine would produce an excessive yawing moment not easily overcome by the aircraft rudder.

To overcome this problem, the fan of a shut down or locked gas turbine engine may be designed continue to spin at above-idle speed as air is forced through the fan due to forward aircraft motion. This unpowered fan rotation is called "windmilling." Even a fan of a shut down engine on the ground may be designed to windmill. A windmilling engine has less aerodynamic drag than does a completely stopped or locked engine. To remain windmilling, the engine must resist damage to the turbine, bearings, etc.

The engine must also be configured to avoid catastrophic damage, which may be caused by fan blade failure, and which might permit fan blade portions to enter the high-pressure turbine. If a part or debris enters the high pressure turbine, for example, centrifugal forces may cause the parts or debris to puncture one or both of the nacelles, the fuselage or allow the engine to detach from the aircraft or damage the wing.

Hence, there is a need for an improved fan blade design that is lightweight, includes hollow cavities that are covered, but that includes a means for covering the hollow cavities that will provide better resistance to damage in the event of any FBO-causing event. The hollow cavities may be filled with a filler material, which may be structural or sacrificial.

SUMMARY OF THE DISCLOSURE

In one aspect, a fan blade is disclosed. The fan blade may comprise a body and a semi-flexible cover. The body may have a pressure side, a suction side adjoining the pressure side along a leading edge and a trailing edge. The body may also have a base and a distal tip. The suction side defines an opening communicating with one or more cavities. The opening has a perimeter. The body may further define a slot extending underneath all or part of the perimeter away from the opening and into the body. The body may further include a lip extending inwardly toward the opening and terminating at the perimeter of the opening. The semi-flexible cover may comprise fiber or resin and have a peripheral edge that may be received into the slot to help secure the cover to the body, thereby covering part or all of the one or more cavities.

A filler material is disposed within at least one of the one or more cavities. The filler material may be a sacrificial material that can decompose, ablate or otherwise diminish in size or weight. The filler material may have a density less than that of the fan blade body to save weight.

The cover may be made of a low temperature resin having a curing temperature, and the sacrificial material may have a melting point lower than the curing temperature.

The fan blade may comprise a flow path configured to allow the sacrificial material to escape from within the body. For example, the fan blade body may define at least one root opening at the fan blade root and at least one tip opening at the fan blade distal tip to allow the sacrificial material to escape from within the body.

There may be more than one cavity, in which case the cavities may be separated by walls or stiffening rubs. The walls may define wall openings configured to allow for the flow of the sacrificial material through the wall openings.

In another aspect, a method for fabricating a fan blade of a turbofan gas turbine engine is provided. The method may comprise the following steps:

manufacturing a body including a pressure side and a suction side, the pressure side and the suction side being disposed between and connected to a leading edge and a trailing edge, the pressure side and the suction side also being disposed between and connected to a base and a distal tip, the suction side including a plurality of cavities that extend through the suction side and towards the pressure side, the cavities being surrounded by a slot that extends outwardly away from the cavities and into the body, the body further including a lip that extends inwardly towards the cavities and that at least partially defines the slot;

at least partially filling the cavities with a sacrificial material;

providing a cover that includes a peripheral edge, the cover being sized so that the peripheral edge is received in the slot; and covering the cavities with the cover by inserting the peripheral edge of the cover into the slot of the body so that the lip at least partially covers the cover.

The method may comprise the additional step of removing at least some of the sacrificial material from the fan blade body, or wherein at least some of the sacrificial material is removed from the fan blade body.

In the method described herein at least some of the sacrificial material may be removed from the fan blade body after the cavities have been covered with the cover.

In the method described herein at least some of the sacrificial material may be removed from the body due to gravity or by being sucked out under negative pressure.

The sacrificial material may have a density less than that of the fan blade body.

The method may comprise the additional step of making the cover 57 using rapid resin transfer under a vacuum assisted cure.

The cover may be made of a low temperature resin having a curing temperature, and the sacrificial material may have a melting point lower than the curing temperature.

The manufacturing step may include making the body with a flow path configured to allow the sacrificial material to escape from within the body.

More specifically, the manufacturing step may include making the body so that the body defines at least one root opening at the fan blade root and at least one tip opening at the fan blade distal tip to allow the sacrificial material to escape from within the body.

The manufacturing step may include making the body with multiple cavities separated by walls, the walls defining wall openings configured to allow for the flow of the sacrificial material through the wall openings.

The composite cover may be fabricated from graphite epoxy material. The body may be manufactured from a material selected from the group consisting of aluminum, an aluminum alloy, titanium, a titanium alloy and combinations thereof.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PREFERRED EMBODIMENTS

Figure 1:
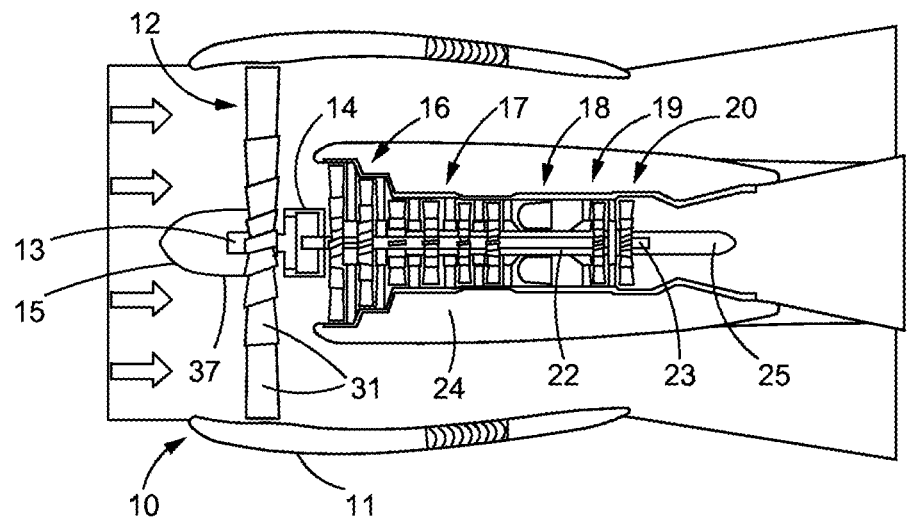
FIG. 1 is a sectional view of a turbofan gas turbine engine.

FIG. 1 illustrates a gas turbine engine 10 that is of the turbofan type. The engine 10 includes a nacelle 11 which surrounds a fan 12 that may be mounted onto a shaft 13 that may be coupled to a gearbox 14. An aerodynamic nose 15 is typically mounted to a fan hub 37 forward of the fan 12. A gearbox 14 may be coupled to a low pressure compressor (LPC) 16 which is disposed forward of a high pressure compressor (HPC) 17. The HPC 17 may be disposed forward of a combustor 18 which, in turn, may be disposed forward of a high pressure turbine (HPT) 19 and a low pressure turbine (LPT) 20. The HPT 19 may be mounted onto a high pressure shaft 22 which drives the HPC 17. The LPT 20 may be mounted onto a low pressure shaft 23 which drives the LPC 16. The LPC 16, HPC 17, combustor 18, HPT 19 and LPT 20 may be housed within a core nacelle 24.

Air flow (indicated by arrows in FIG. 1) enters the nacelle 11, which may at least partially surround the core nacelle 24. The fan 12 may communicate airflow into the core nacelle 24 and to the LPC 16 and the HPC 17. Core air flow compressed by first by the LPC 16 and then by the HPC 17 may be mixed with fuel in the combustor 18 where it may be ignited and burned. The resultant high pressure combustion products pass through and drive the HPT 19 and LPT 20. The high and low pressure turbines 19, 20 are separately and rotationally coupled to the high and low compressors 17, 16 respectively to drive the compressors 17, 16 in response to expansion of the combustion products received from the combustor 18. The LPT 20 may also drive the fan 12 through the low pressure shaft 23, which may be coupled to gear box 14. An exhaust stream exits the core nacelle 24 past a tail cone 25.

Figure 2:
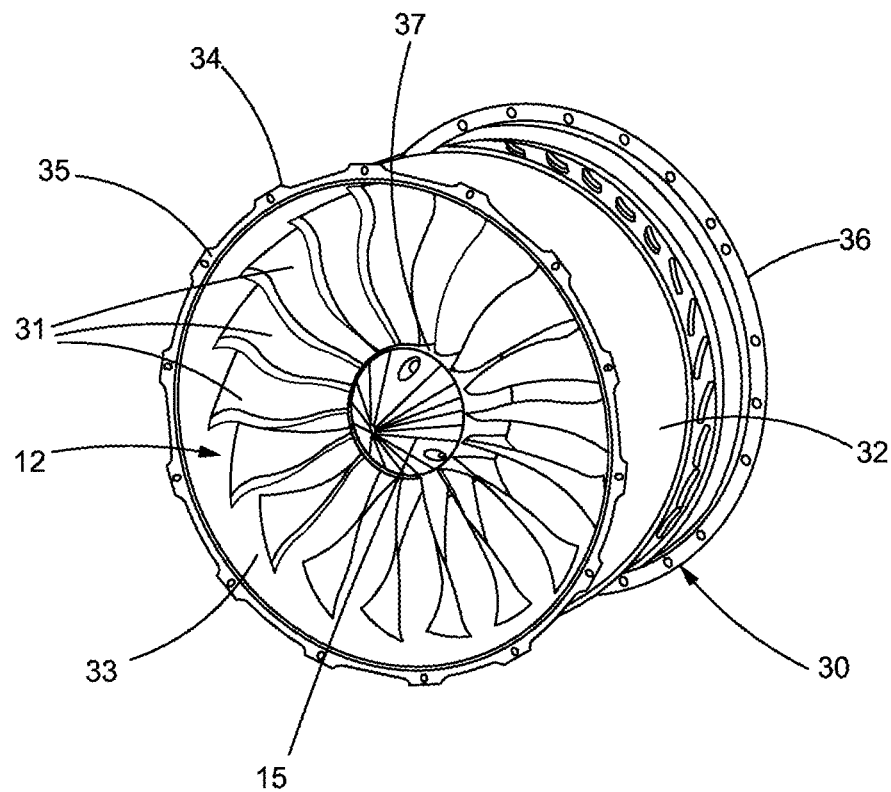
FIG. 2 is a perspective view of a fan case and fan blade assembly for a turbofan gas turbine engine such as the engine illustrated in FIG. 1.

FIG. 2 shows a fan case 30 (not shown in FIG. 1) that surrounds the fan 12 having an array of fan blades 31. The fan case 30 may include: a hollow body 32; an abradable liner 33 disposed inside the hollow body 32; a forward flange 34 on the hollow body 32 defining a surface 35 for mating to a forward part of the nacelle 11 (not shown); and a rear flange 36 for mating to an aft part of the nacelle 11 (also not shown). The abradable liner 33 circumscribes the fan blades 31 which are coupled to the hub 37. The fan 12 includes the hub 37 and a plurality of circumferentially spaced apart fan blades 31 (a.k.a., rotor blades or airfoils) extending radially outwardly from a periphery 43 of the annular hub 37.

Figure 3:
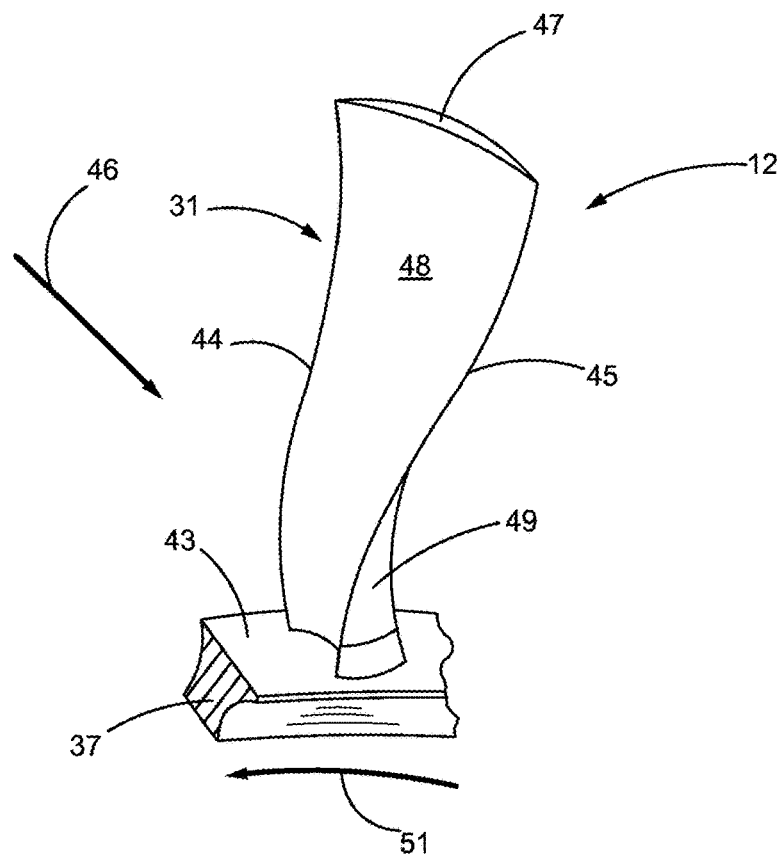
FIG. 3 is a perspective view of a fan blade coupled to a hub.

FIG. 3 is a perspective view of a single fan blade 31 coupled to the hub 37. The fan blade 31 may include a leading edge 44 and a 45 with respect to the airflow direction as indicated by arrow 46. The leading and trailing edges 44, 45 extend from the periphery 43 of the hub 37 to a tip 47 of the fan blade 31. The fan blade 31 may further include a generally concave pressure side 48 and a generally convex suction side 49 joined together at the respective leading and trailing edges 44, 45. The fan blade 31 rotates in a rotational direction as illustrated by arrow 51. The pressure side 48 and the suction side 49 are aerodynamically configured for maximizing the efficiency of air compression and achieve a desired pressure ratio. It will be noted that fan blades for gas turbine engines may be provided in the variety of sizes, shapes and styles. The fan blades designated by element number 31 in FIGS. 2-3 and 5-9 are but mere examples and this disclosure is not limited to the specific fan blades disclosed herein. Further, the disclosed fan blade designs may be adapted for use in other types of jet engines, propellers, rotors, etc.

Figure 4:
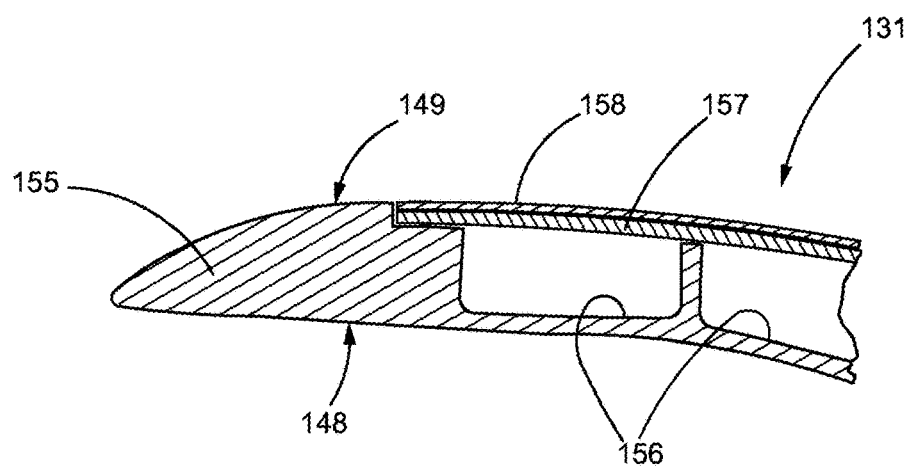
FIG. 4 is a partial sectional view of a prior art fan blade.

This disclosure relates to the convex or suction side 49 of a fan blade 31 (or airfoil, rotor blade, etc.) shown in FIG. 3. Referring to the prior art fan blade 131 illustrated in FIG. 4, the fan blade 131 may include a main body 155 that is typically fabricated from titanium, a titanium alloy, aluminum, aluminum alloy or other suitable structural material(s) that will be apparent to those skilled in the art. To reduce the weight of the fan blade 131, cavities 156 are formed through the suction side 149 of the fan blade 131. A cover 157 may be placed over the cavities 156 as shown in FIG. 4.

To provide a smooth transition between the cover 157 and the body 155 of the fan blade 131, a coating 158 may be applied over the cover 157. While the coating 158 may be a damage tolerant coating, during a FOD (foreign object damage) event such as a bird strike, the cover 157 can become dislodged from the fan blade 131 which can cause damage to downstream components of the engine 10 illustrated in FIG. 1.

Typically, the cover 157 may be fabricated from a fiber/resin composite material, usually graphite epoxy based, such as carbon fiber reinforced polymer (CFRP) and/or glass fiber reinforced polymer (GFRP). The protective coating 158 that is applied over the composite cover 157 may be made from an elastomer such as a fluoropolymer elastomer like VITON® fluoroelastomer. Thus, a typical cover 157 may be fabricated from relatively robust materials that can damage various downstream components such as the LPC 16, HPC 17, combustor 18, HPT 19 or LPT 20 or various parts or components associated with any portion of the engine 10 disposed downstream of the fan 12.

Figures 5, 6:
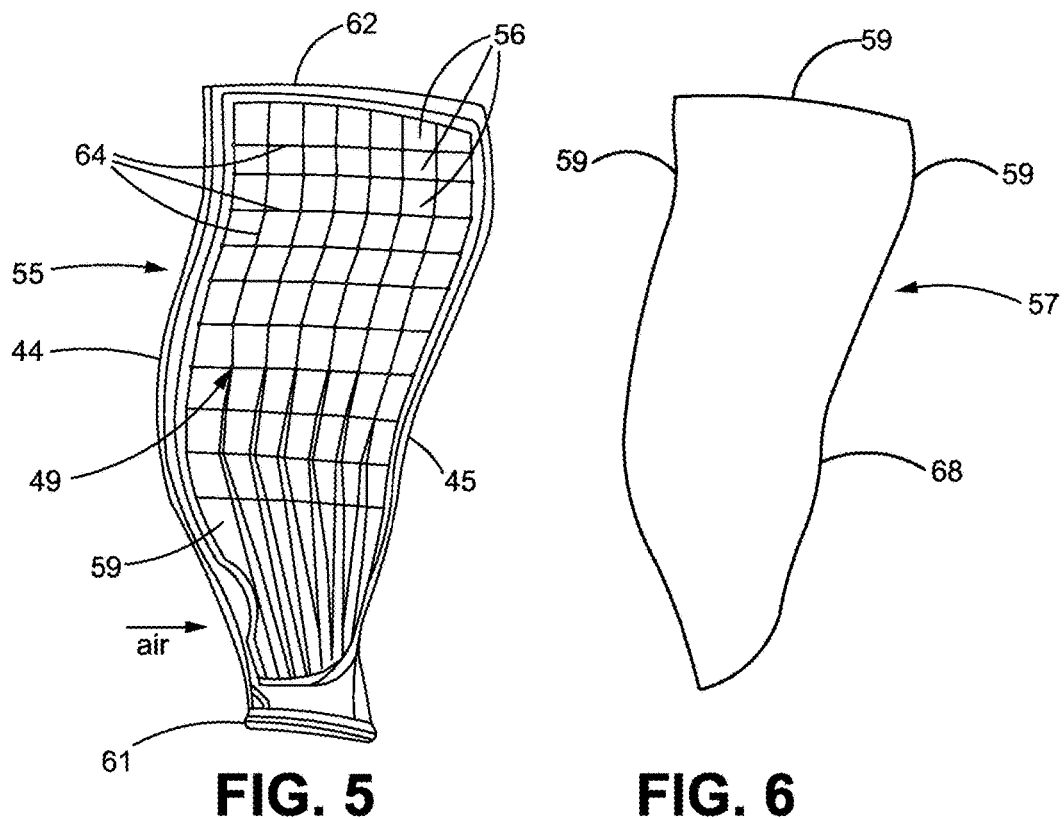
FIG. 5 is a perspective view of a metallic fan blade body used to fabricate a fan blade in accordance with this disclosure.
FIG. 6 is a cover for the cavities disposed on the suction side of the fan blade body illustrated in FIG. 5.

Turning to FIG. 5, a disclosed fan blade body 55 may include a base or root 61 for coupling the fan blade body 55 to the hub 37 (see FIGS. 1-3). The fan blade body 55 also includes a distal tip 62. In FIG. 5, the convex suction side 49 of the body 55 is shown which includes an opening 52 having a perimeter 54 and communicating with one or more cavities 56. In the case of multiple cavities 56, the cavities 56 are separated by intersecting stiffening ribs or walls 64. The suction side 49 of the body 55 may be disposed between a leading edge 44 and a trailing edge 45.

To enclose the cavities 56, a cover 57 like that shown in FIG. 6 may be used. The cover 57 is intended to provide a smooth surface for air flow along the suction side 49 of the fan blade 31.

Figure 7:
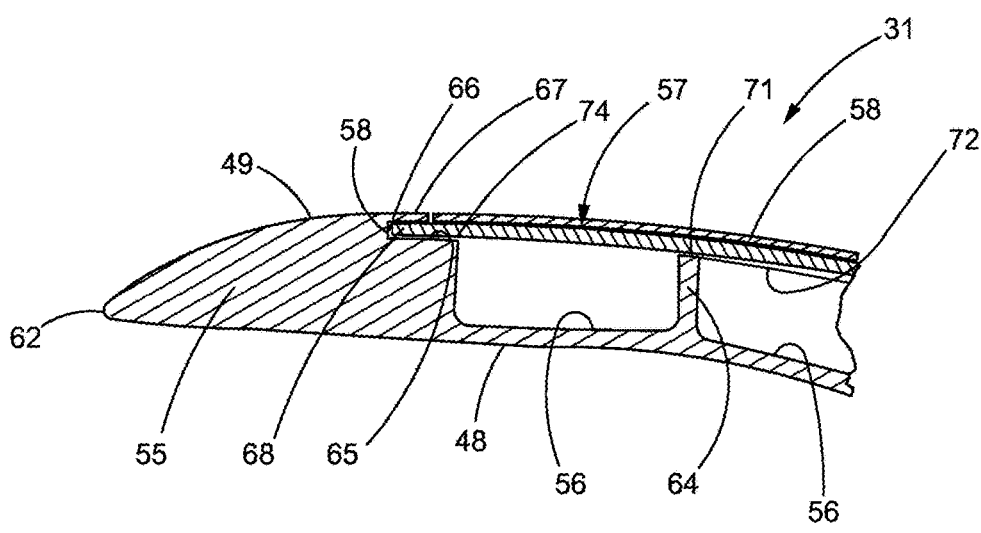
FIG. 7 is a partial sectional view of a disclosed fan blade.

As shown in FIG. 7, in contrast to relying upon an exterior coating to secure the cover 57 to the body 55 as shown in FIG. 4, the body 55 may include a peripheral slot 65. The peripheral slot 65 may include a distal end 66 and may further be defined by a lip 67. In essence, the slot 65 extends laterally from the cavity 56 before terminating at the distal end 66. The body 55 then extends inwardly back towards the cavity 56 in the form of the lip 67 that further defines the slot 65. The slot 65 is used to accommodate a peripheral edge 68 of the cover 57. By positioning the peripheral edge 68 of the cover 57 in the slot 65 of the fan blade body 55, a more secure connection between the cover 57 and the body 55 is established. The contour of the cover 57, that is, the shape of its inner surface, should match the 3-D contour defined by the outer surfaces of the stiffening ribs 64. An optional coating 58 may be applied to the cover 57 without the need for applying the coating 58 over the lip 67.

Still referring to FIG. 7, the walls 64 that separate the cavities 56 may terminate at an upper edge 71 that engages an underside 72 of the cover 57. The upper edges 71 of the walls 64 may be substantially coplanar with the slot 65. More specifically, the upper edges 71 of the walls 64 that separate the cavities 56 may be coplanar with the upper surface 74 of the inner wall 73 of the body 55 that, with the lip 67, defines the slot 65.

Composite structures like the composite cover 57 can be pliable before curing and so can be bent or crinkled to tuck under the lip 67. However, it is important that a sufficient bond be created along the bimaterial interface, that is, along the area of contact between the peripheral edge 59 of the composite cover 57 and the metallic inner walls of the slot 65, especially at the distal end 66 of the slot 65.

Figure 8:
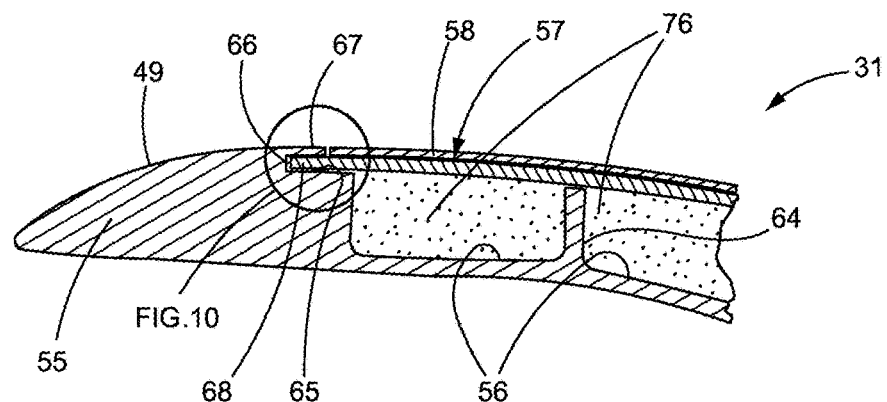
FIG. 8 is a partial sectional view of another disclosed fan blade wherein the cavities are filled with a filler material.

The cavities 56 may be filled wholly or partially with a filler material. The filler material may be structural material 76 that forms a permanent part of the fan blade 31 as shown in FIG. 8 or a sacrificial material 78 when the objective is to make the fan blade 31 as light as possible as shown in FIG. 9.

Figure 10:
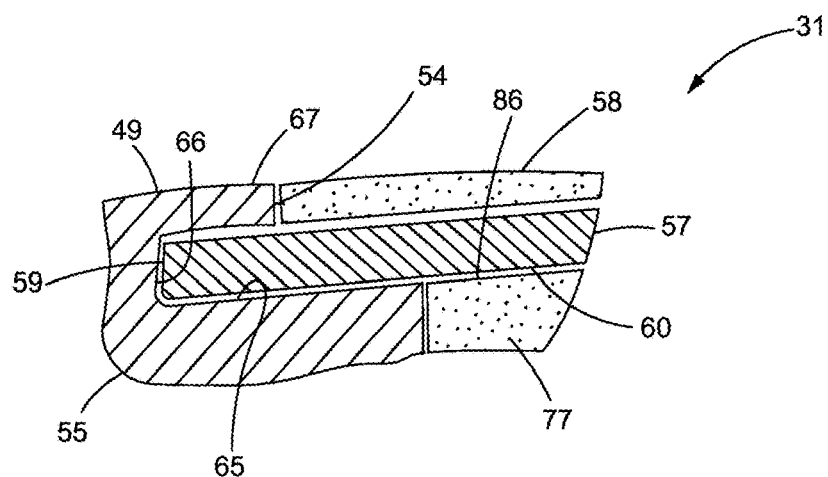
FIG. 10 is a close up view of a portion of the fan blade of FIG. 8.

Structural filler material 76 may provide several benefits. First, as shown in FIG. 10, the filler material 76 provides additional surface area 86 to which the cover 57 can contact and then bond or mate. Second, the filler material 76 may have an outer surface 86 that conforms to the inner surface 60 of the cover 57 to prevent cupping, that is, inward distortion of the cover 57 between the upper edges 71 of the stiffening ribs 64 due to the relatively lower pressure within the fan blade cavities 56 compared to outside the fan blade 31. Third, the filler material 76 may increase the ability of the fan blade 31 to carry shear load.

Sacrificial filler material 78 may be used in at least two circumstances. In one circumstance, sacrificial filler material 78 is used that decomposes or otherwise ablates during the curing of the cover 57 and the coating 58. In a second circumstance, sacrificial filler material 78 may be used when the cover 57 is made using rapid resin transfer under a vacuum assisted cure but the filler material 78 is not needed for its structural enhancing properties and the extra weight of the filler material 78 is not desirable. In this instance, a flow path must be designed for the filler material to escape, such as by using a chemical etch. Alternatively, the cover 57 may be made with a lower temperature resin that only requires heating to, say, 150 degrees F., allowing the sacrificial filler material 78 to weep out due to gravity or sucked out under negative pressure.

Figure 9:
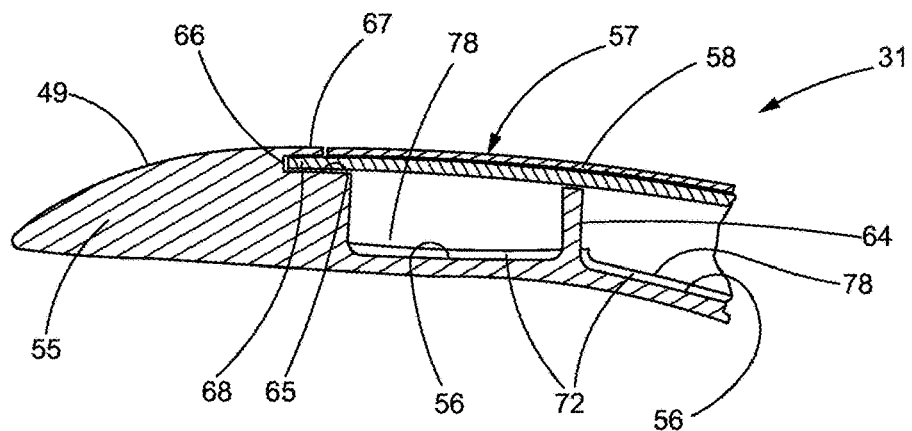
FIG. 9 is a sectional view of yet another disclosed fan blade wherein the cavities include residual amounts of sacrificial material after the curing process has been completed.

FIG. 9 shows a fan blade 31 having only residual amounts of filler material 78 disposed in the cavities 56 as might be left over after the sacrificial filler material 78 has decomposed or otherwise ablated during the curing of the cover 57 and the coating 58, or after the sacrificial filler material 78 has been otherwise removed.

Figure 11:
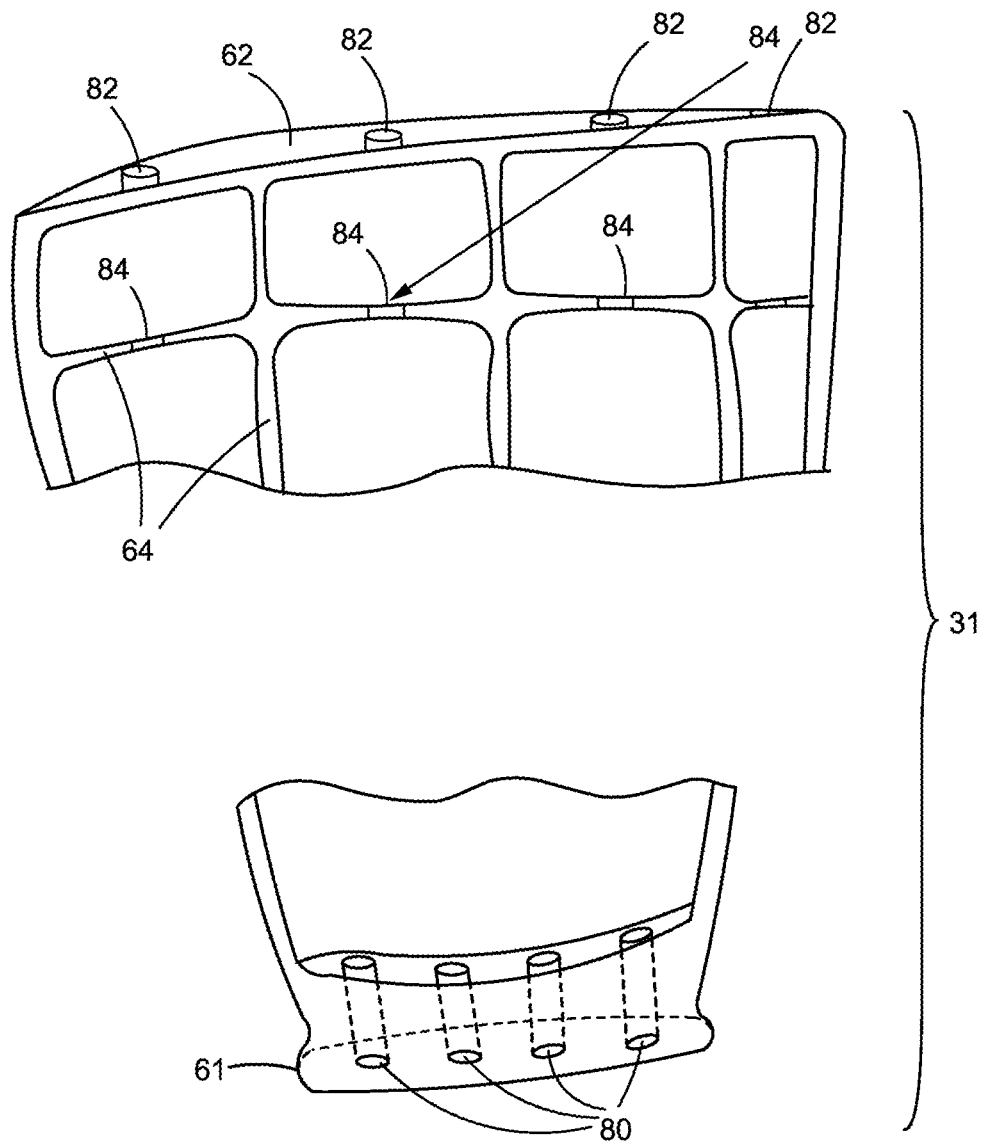
FIG. 11 is a close up perspective view of a fan blade distal tip and root.

The internal rib structure 64 should be configured to allow for the flow of the filler material 78 out of the cavities 56, either by manufacture processing, gravity, centrifugal cleaning or in some other manner. Accordingly, openings may be formed in the fan blade 31 for this purpose, such as at the fan blade root 61 and at the fan blade distal tip 62, as well as in the stiffening ribs 64. FIG. 11 shows a fan blade 31 with openings 80 at the fan blade root 61, openings 82 at the fan blade distal tip 62, and openings 84 in the stiffening ribs 64.

In another aspect of the disclosure a method for fabricating a fan blade 31 of a turbofan gas turbine engine 10 is provided. The method may comprises the following steps:

manufacturing a body 55 including a pressure side 48 and a suction side 49, the pressure side 48 and the suction side 49 being disposed between and connected to a leading edge 44 and a trailing edge 45, the pressure side 48 and the suction side 49 also being disposed between and connected to a base 61 and a distal tip 62, the suction side 49 including a plurality of cavities 56 that extend through the suction side 49 and towards the pressure side 48, the cavities 56 being surrounded by a slot 65 that extends outwardly away from the cavities 56 and into the body 55, the body 55 further including a lip 67 that extends inwardly towards the cavities 56 and that at least partially defines the slot 65;

at least partially filling the cavities 56 with a structural material 76;

providing a cover 57 that includes a peripheral edge 59, the cover 57 being sized so that the peripheral edge 59 is received in the slot 65; and covering the cavities 56 with the cover 57 by inserting the peripheral edge 59 of the cover 57 into the slot 65 of the body 55 so that the lip 67 at least partially covers the cover 57.

In the method described above the structural material 76 may form a permanent part of the fan blade.

In the method described above the cover 57 may contact the structural material 76. In addition, the cover 57 may be bonded or otherwise affixed to the structural material 76.

In the method described above the structural material 76 may have an outer surface 86 that conforms to the inner surface 60 of the cover 57 to prevent inward distortion of the cover 57.

The cover 57 may be a composite material such as graphite epoxy. The protective coating 58 that is applied over the cover 57 may be a fluoroelastomer. The fan blade body 55 may be metal, and may be manufactured from a material selected from the group consisting of aluminum, an aluminum alloy, titanium, a titanium alloy and combinations thereof.

What is claimed:

1. A fan blade comprising:
a body having a pressure side, a suction side adjoining the pressure side along a leading edge and a trailing edge, the pressure side, the body having a base and a distal tip;
the suction side defining an opening communicating with one or more cavities, the opening having a perimeter;
the body further defining a slot extending from all or part of the perimeter away from the opening and into the body;
the body further including a lip extending inwardly toward the opening and terminating at the perimeter of the opening;
a semi-flexible cover comprising fiber or resin and having a peripheral edge that may be received into the slot to help secure the cover to the body, thereby covering part or all of the one or more cavities, the cover having an inner surface configured to face the opening; and
a filler material disposed within at least one of the one or more cavities, wherein the body further includes a lip extending inwardly toward the opening and terminating at the perimeter of the opening, wherein the body includes an inner wall that, with the lip defines the slot, the inner wall having an upper surface upon which the cover is located when the cover is located in the opening and a peripheral edge of the cover is received in the slot.

2. The fan blade of claim 1 wherein the filler material is a sacrificial material that can decompose, ablate or otherwise diminish in size or weight.

3. The fan blade of claim 1 wherein the filler material has a density less than that of the fan blade body.

4. The fan blade of claim 2 wherein:
the cover is made of a resin having a curing temperature; and
the sacrificial material has a melting point lower than the curing temperature.

5. The fan blade of claim 2 further comprising a flow path configured to allow the sacrificial material to escape from within the body.

6. The fan blade of claim 2 wherein;
the body defines at least one root opening at the fan blade base and at least one tip opening at the fan blade distal tip to allow the sacrificial material to escape from within the body.

7. The fan blade of claim 6 wherein:
the number of cavities is at least two;
the cavities are separated by walls; and
the walls define wall openings configured to allow for a flow of the sacrificial material through the wall openings.

8. A method for fabricating a fan blade of a turbofan gas turbine engine, the method comprising:
manufacturing a body including a pressure side and a suction side, the pressure side and the suction side being disposed between and connected to a leading edge and a trailing edge, the pressure side and the suction side also being disposed between and connected to a base and a distal tip, the suction side including a plurality of cavities that extend through the suction side and towards the pressure side, the cavities being surrounded by a slot that extends outwardly away from the cavities and into the body, the body further including a lip that extends inwardly towards the cavities and that at least partially defines the slot, wherein the body includes an inner wall that, with the lip defines the slot, the inner wall having an upper surface upon which a cover is located when the cover is located within an opening communicating with the plurality of cavities and a peripheral edge of the cover is received in the slot;

at least partially filling the cavities with a sacrificial material; and covering the cavities with the cover by inserting the peripheral edge of the cover into the slot of the body so that the lip at least partially covers the cover.

9. The method of claim 8 comprising the additional step of removing at least some of the sacrificial material from the fan blade body.

10. The method of claim 8 wherein at least some of the sacrificial material is removed from the fan blade body.

11. The method of claim 10 wherein at least some of the sacrificial material is removed from the fan blade body after the cavities have been covered with the cover.

12. The method of claim 8 wherein at least some of the sacrificial material is removed from the body due to gravity or by being sucked out under negative pressure.

13. The method of claim 8 wherein the sacrificial material has a density less than that of the fan blade body.

14. The method of claim 8 comprising the additional step of:

making the cover using rapid resin transfer under a vacuum assisted cure.

15. The method of claim 14 wherein:

the cover is made of a resin having a curing temperature; and the sacrificial material has a melting point lower than the curing temperature.

16. The method of claim 8 wherein:

the manufacturing step includes making the body with a flow path configured to allow the sacrificial material to escape from within the body.

17. The method of claim 8 wherein:

the manufacturing step includes making the body so that the body defines at least one root opening at the fan blade base and at least one tip opening at the fan blade distal tip to allow the sacrificial material to escape from within the body.

18. The method of claim 8 wherein:

the manufacturing step includes making the body with multiple cavities separated by walls, the walls defining wall openings configured to allow for a flow of the sacrificial material through the wall openings.

19. The method of claim 8 wherein the cover is fabricated from graphite epoxy material.

20. The method of claim 8 wherein the body is manufactured from a material selected from the group consisting of aluminum, an aluminum alloy, titanium, a titanium alloy and combinations thereof.

* * * * *